(12) United States Patent (10) Patent No.: US 12,689,235 B2
Kaiwa et al. (45) Date of Patent: Jul. 21, 2026

(54) WIRELESS POWER RECEIVING DEVICE

(71) Applicant: Murata Manufacturing Co., Ltd., Kyoto-fu (JP)

(72) Inventors: Koyo Kaiwa, Nagaokakyo (JP); Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 853 days.

(21) Appl. No.: 18/058,834

(22) Filed: Nov. 25, 2022

(65) Prior Publication Data

US 2023/0086709 A1 Mar. 23, 2023

Related U.S. Application Data

(63) Continuation of application No. PCT/JP2020/046025, filed on Dec. 10, 2020.

(30) Foreign Application Priority Data

May 27, 2020 (JP) ................................. 2020-092194

(51) Int. Cl.
H02J 50/12 (2016.01)
H02J 7/90 (2026.01)
(Continued)

(52) U.S. Cl.
CPC ................ H02J 50/12 (2016.02); H02J 7/90 (2026.01); H02J 7/96 (2026.01); *H02J 2207/20* (2020.01);
(Continued)

(58) Field of Classification Search
CPC ...... H02J 7/007182; H02J 7/007; H02J 50/12; H02J 2207/20; H02J 7/90; H02J 7/96
(Continued)

(56) References Cited

U.S. PATENT DOCUMENTS 6,320,763 B2 * 11/2001 Hosotani ............. H02M 3/3382
363/16
8,030,902 B2 * 10/2011 Kung .................. H01M 10/441
320/160
(Continued)

FOREIGN PATENT DOCUMENTS

CN          209928116 U   *  1/2020
JP        2011-205825 A      10/2011
(Continued)

OTHER PUBLICATIONS

International Search Report issued in PCT/JP2020/046025; mailed Feb. 22, 2021.

*Primary Examiner* — John T Trischler

(74) *Attorney, Agent, or Firm* — Studebaker Brackett PLLC

(57) ABSTRACT

A device includes a power receiving resonant circuit, a rectifier circuit, a voltage conversion circuit, and a charge control circuit that charges an electric storage device. The charge control circuit starts charging the electric storage device when a received voltage is greater than or equal to a first received voltage value, decreases a set value of a charging current for the electric storage device when a charging voltage is less than a predetermined charging voltage value, increases the set value of the charging current for the electric storage device when the received voltage is greater than or equal to a second received voltage value higher than a predetermined charging voltage value, and maintains the set value of the charging current when the charging voltage is greater than or equal to the predetermined charging voltage value and the received voltage is less than the second received voltage value.

20 Claims, 4 Drawing Sheets

(51) Int. Cl.

| | |
|---|---|
| *H02J 7/96* | (2026.01) |
| *H02M 3/137* | (2006.01) |
| *H02M 3/156* | (2006.01) |
| *H02M 3/335* | (2006.01) |
| *H02M 3/142* | (2006.01) |
| *H02M 3/315* | (2006.01) |
| *H02M 3/337* | (2006.01) |

(52) U.S. Cl.
CPC ............ *H02M 3/137* (2013.01); *H02M 3/142* (2013.01); *H02M 3/156* (2013.01); *H02M 3/3155* (2013.01); *H02M 3/33507* (2013.01); *H02M 3/33546* (2013.01); *H02M 3/3376* (2013.01)

(58) Field of Classification Search
USPC .......................................... 320/108; 307/104
See application file for complete search history.

(56) References Cited

U.S. PATENT DOCUMENTS

| | | | | |
|---|---|---|---|---|
| 8,169,185 | B2* | 5/2012 | Partovi | H01F 27/366 320/108 |
| 8,330,414 | B2* | 12/2012 | Takahashi | H01M 10/44 363/75 |
| 8,749,215 | B2* | 6/2014 | Hester | H02M 3/1582 323/285 |
| 8,987,941 | B2* | 3/2015 | Ichikawa | H02J 50/12 307/104 |
| 9,118,357 | B2* | 8/2015 | Tseng | H02J 50/80 |
| 9,142,989 | B2* | 9/2015 | Fell | H02J 50/10 |
| 9,166,442 | B1* | 10/2015 | Belch | H02J 7/60 |
| 9,270,134 | B2* | 2/2016 | Gaddam | H02J 50/80 |
| 9,312,767 | B2* | 4/2016 | Sandner | H02J 50/10 |
| 9,362,779 | B2* | 6/2016 | Takahashi | H02J 50/80 |
| 9,407,109 | B2* | 8/2016 | Takahashi | H02J 50/60 |
| 9,438,055 | B2* | 9/2016 | Chen | H02J 7/007 |
| 9,461,481 | B2* | 10/2016 | Tseng | H04B 5/79 |
| 9,473,030 | B2* | 10/2016 | Hosotani | H02J 7/34 |
| 9,473,041 | B2* | 10/2016 | Hosotani | H02J 7/007184 |
| 9,543,912 | B2* | 1/2017 | Lee | H03F 3/301 |
| 9,685,811 | B2* | 6/2017 | Kim | H02J 7/007 |
| 9,935,487 | B2* | 4/2018 | Shibata | H02J 50/12 |
| 9,948,144 | B2* | 4/2018 | Sakai | H02J 50/12 |
| 10,097,045 | B2* | 10/2018 | Guidi | H02J 50/10 |
| 10,135,289 | B2* | 11/2018 | Kim | H02J 7/92 |
| 10,141,980 | B2* | 11/2018 | Hijikata | H04B 17/364 |
| 10,277,062 | B2* | 4/2019 | Govindaraj | B60L 53/122 |
| 10,348,135 | B2* | 7/2019 | Bae | H02J 50/12 |
| 10,353,458 | B2* | 7/2019 | Mori | H02M 7/12 |
| 10,361,575 | B2* | 7/2019 | Sugeno | H01M 10/441 |
| 10,381,862 | B2* | 8/2019 | Mori | H02J 7/34 |
| 10,404,328 | B2* | 9/2019 | Onishi | H04B 5/266 |
| 10,432,037 | B2* | 10/2019 | Kim | H02J 7/00036 |
| 10,483,810 | B2* | 11/2019 | Sorge | H04B 5/24 |
| 10,601,240 | B2* | 3/2020 | Onishi | H01M 10/44 |
| 10,608,473 | B2* | 3/2020 | Tsukiyama | H02J 50/12 |
| 10,608,475 | B2* | 3/2020 | Bae | H02J 7/0068 |
| 10,790,737 | B2* | 9/2020 | Luo | H02M 3/1582 |
| 10,797,538 | B2* | 10/2020 | Kim | H02J 7/04 |
| 10,826,318 | B2* | 11/2020 | Tagawa | H02M 1/36 |
| 10,868,586 | B2* | 12/2020 | Onishi | H04B 5/266 |
| 10,971,953 | B2* | 4/2021 | Kawamae | H01F 38/14 |
| 11,043,856 | B2* | 6/2021 | Kim | H02J 7/04 |
| 11,070,086 | B2* | 7/2021 | Oshima | H02M 3/22 |
| 11,088,626 | B2* | 8/2021 | Hayasaki | H02M 3/33571 |
| 11,277,036 | B2* | 3/2022 | Morioka | H02J 50/27 |
| 11,368,038 | B2* | 6/2022 | Kristjansson | H02J 50/80 |
| 11,557,920 | B2* | 1/2023 | Fan | H02J 7/02 |
| 11,658,507 | B2* | 5/2023 | Yoon | H02J 7/34 320/137 |
| 11,699,923 | B2* | 7/2023 | Yagi | B60L 53/12 307/104 |
| 11,824,396 | B2* | 11/2023 | Jia | H01M 10/48 |
| 11,843,273 | B2* | 12/2023 | Mori | H02J 7/0047 |
| 12,027,878 | B2* | 7/2024 | Hosotani | H02M 1/007 |
| 12,046,920 | B2* | 7/2024 | Sjoeroos | H02J 50/50 |
| 12,288,854 | B2* | 4/2025 | Hosotani | H02H 7/16 |
| 12,308,657 | B2* | 5/2025 | Yang | H02J 50/80 |
| 12,316,154 | B2* | 5/2025 | Gu | H02J 7/02 |
| 12,334,766 | B2* | 6/2025 | Morimoto | H02J 7/84 |
| 12,348,056 | B2* | 7/2025 | Jung | H02J 50/70 |
| 2001/0007530 | A1* | 7/2001 | Hosotani | H02M 3/33571 363/20 |
| 2007/0267997 | A1* | 11/2007 | Kanazawa | H02J 7/16 180/68.5 |
| 2008/0309293 | A1* | 12/2008 | Kung | H02J 7/0071 320/160 |
| 2009/0096413 | A1* | 4/2009 | Partovi | H02J 7/0013 320/108 |
| 2009/0206791 | A1* | 8/2009 | Jung | H02J 50/70 320/108 |
| 2010/0066305 | A1* | 3/2010 | Takahashi | H01M 10/44 320/108 |
| 2012/0038218 | A1* | 2/2012 | Ichikawa | H02J 50/70 307/104 |
| 2012/0049816 | A1* | 3/2012 | Hester | H02M 1/14 323/282 |
| 2012/0242160 | A1* | 9/2012 | Tseng | H04B 5/26 307/104 |
| 2013/0057206 | A1* | 3/2013 | Takahashi | H02J 50/80 320/108 |
| 2013/0193914 | A1* | 8/2013 | Gaddam | H02J 50/80 320/108 |
| 2013/0221914 | A1* | 8/2013 | Kim | H02J 7/007 320/108 |
| 2014/0015496 | A1* | 1/2014 | Nishiguchi | H02M 3/33507 320/162 |
| 2014/0074185 | A1* | 3/2014 | Fell | A61N 1/3787 320/108 |
| 2014/0217968 | A1* | 8/2014 | Takahashi | H01M 10/44 320/108 |
| 2014/0328098 | A1* | 11/2014 | Hosotani | H02M 3/33515 363/89 |
| 2014/0334185 | A1* | 11/2014 | Hosotani | H02M 3/24 363/15 |
| 2014/0375251 | A1* | 12/2014 | Sakai | H02M 7/537 307/149 |
| 2015/0084694 | A1* | 3/2015 | Lee | H03F 1/483 327/170 |
| 2015/0137769 | A1* | 5/2015 | Chen | H02J 7/007 320/157 |
| 2015/0162828 | A1* | 6/2015 | Sandner | H02J 7/02 323/271 |
| 2015/0357832 | A1* | 12/2015 | Tseng | H04B 5/26 307/104 |
| 2016/0164307 | A1* | 6/2016 | Shibata | H02J 50/05 307/104 |
| 2017/0033591 | A1* | 2/2017 | Govindaraj | H02J 50/10 |
| 2017/0155272 | A1* | 6/2017 | Kim | H02J 7/92 |
| 2017/0237302 | A1* | 8/2017 | Sorge | H02J 50/12 307/104 |
| 2017/0250564 | A1* | 8/2017 | Kim | H02J 50/90 |
| 2017/0373520 | A1* | 12/2017 | Sugeno | H01M 10/441 |
| 2017/0373540 | A1* | 12/2017 | Guidi | H02M 3/33507 |
| 2018/0123397 | A1* | 5/2018 | Tsukiyama | H02J 50/12 |
| 2018/0123646 | A1* | 5/2018 | Onishi | H04B 5/266 |
| 2018/0152041 | A1* | 5/2018 | Onishi | H02J 50/80 |
| 2018/0287427 | A1* | 10/2018 | Oshima | H02J 50/40 |
| 2018/0316391 | A1* | 11/2018 | Hijikata | H02J 50/10 |
| 2018/0342902 | A1* | 11/2018 | Bae | H02J 5/00 |
| 2019/0006843 | A1* | 1/2019 | Suzuki | H02J 50/80 |
| 2019/0094951 | A1* | 3/2019 | Mori | H02M 3/04 |
| 2019/0097452 | A1* | 3/2019 | Mori | H02J 3/32 |
| 2019/0190319 | A1* | 6/2019 | Kawamae | H02M 7/46 |
| 2019/0288561 | A1* | 9/2019 | Bae | H02J 50/80 |
| 2019/0334429 | A1* | 10/2019 | Luo | H02M 1/08 |
| 2019/0341969 | A1* | 11/2019 | Onishi | H02J 50/10 |
| 2020/0028387 | A1* | 1/2020 | Kim | H02J 7/04 |
| 2020/0044458 | A1* | 2/2020 | Yoon | H02J 7/34 |

(56) References Cited

U.S. PATENT DOCUMENTS

| | | | | |
|---|---|---|---|---|
| 2020/0112263 A1* | 4/2020 | Hayasaki | | H02M 3/33592 |
| 2020/0203985 A1* | 6/2020 | Tagawa | | H02J 7/34 |
| 2021/0006100 A1* | 1/2021 | Kim | | H02J 7/04 |
| 2021/0036551 A1* | 2/2021 | Fan | | H02J 7/02 |
| 2021/0044132 A1* | 2/2021 | Kristjansson | | H02J 50/10 |
| 2021/0194268 A1* | 6/2021 | Jia | | H02J 7/02 |
| 2021/0194291 A1* | 6/2021 | Yeo | | H02M 7/25 |
| 2021/0218285 A1* | 7/2021 | Morioka | | H02H 9/04 |
| 2021/0344232 A1* | 11/2021 | Sjoeroos | | H02J 50/50 |
| 2022/0109195 A1* | 4/2022 | Morimoto | | H02J 7/84 |
| 2022/0173619 A1* | 6/2022 | Yagi | | H02J 50/80 |
| 2022/0190621 A1* | 6/2022 | Gu | | H02J 50/80 |
| 2022/0231348 A1* | 7/2022 | Hosotani | | H01M 10/443 |
| 2022/0231530 A1* | 7/2022 | Mori | | H02J 7/0063 |
| 2022/0239155 A1* | 7/2022 | Yang | | H02J 50/80 |
| 2022/0263351 A1* | 8/2022 | Yang | | H02J 50/402 |
| 2023/0024417 A1* | 1/2023 | Yamaguchi | | H02J 7/00714 |
| 2023/0040473 A1* | 2/2023 | Gu | | H02J 50/80 |
| 2023/0147880 A1* | 5/2023 | Hosotani | | H02J 50/12 |
| | | | | 307/104 |
| 2024/0014672 A1* | 1/2024 | Ishisaka | | H02J 7/00712 |
| 2025/0047125 A1* | 2/2025 | Furuhashi | | H02J 7/04 |

FOREIGN PATENT DOCUMENTS

| | | | | |
|---|---|---|---|---|
| JP | 2013066279 A | * | 4/2013 | |
| JP | 3208726 U | | 2/2017 | |
| JP | 2018-504088 A | | 2/2018 | |

* cited by examiner

FIG. 3

| CONDITION | ISET1 | ISET2 | CHARGING CURRENT [mA] |
|-----------|-------|-------|------------------------|
| A | 0 | 0 | 1.85 |
| B | 0 | 1 | 4.60 |
| C | 1 | 0 | 7.51 |
| D | 1 | 1 | 9.97 |

WIRELESS POWER RECEIVING DEVICE

CROSS-REFERENCE TO RELATED APPLICATIONS

This application claims benefit of priority to International Patent Application No. PCT/JP2020/046025, filed Dec. 10, 2020, and to Japanese Patent Application No. 2020-092194, filed May 27, 2020, the entire contents of each are incorporated herein by reference.

BACKGROUND

Technical Field

The present disclosure relates to a wireless power receiving device that wirelessly receives electric power, charges an electric storage device, and supplies electric power to an electronic function circuit.

Background Art

In general, to charge a charging device with high charging efficiency in a wireless power supply system, it is important to determine the charging characteristics of devices constituting the wireless power supply system. For example, Japanese Registered Utility Model No. 3208726 describes a wireless power supply system that can observe charging characteristics for a charging device. Japanese Registered Utility Model No. 3208726 describes a configuration in which a constant charging current is supplied using received power. Also, Japanese Registered Utility Model No. 3208726 describes that an output unit is provided to output a detection value of at least one of supply power, transmission power, received power, and a charging current.

SUMMARY

In general, in a wireless power supply system, received power varies depending on power consumption. Because the received voltage becomes high when the received current is low and the received voltage becomes low when the received current is high, the received power takes extreme values. Also, charging an electric storage device with a high charging current reduces charging time and increases convenience.

However, the received power changes when the positional relationship between a power transmission device and a power receiving device changes in a wireless power receiving device. The received power also changes as the power conversion operation of the power transmission device changes. For example, when a high charging current is set to reduce the charging time of a secondary battery, in a situation in which sufficient received voltage is not obtained, the received voltage decreases and it becomes unable to charge the secondary battery. Also, when a low charging current is set to charge the secondary battery without fail, the charging time of the secondary battery increases. In this case, the received voltage also increases, and high voltage stress is applied to, for example, a rectifier circuit and a power receiving circuit.

Accordingly, the present disclosure provides a wireless power receiving device configured to automatically set a charging current according to received power so that higher received power is usable, and to provide a reliable wireless power receiving device configured to prevent an electric storage device from being overcharged and prevent an overvoltage from being applied to a power receiving circuit.

A wireless power receiving device as an example of this disclosure includes a power receiving resonant circuit including a power receiving coil and a resonant capacitor connected to the power receiving coil, a rectifier circuit that rectifies a voltage of the power receiving resonant circuit, a voltage conversion circuit that converts an output voltage of the rectifier circuit, and a charge control circuit that charges an electric storage device with an output of the voltage conversion circuit.

The charge control circuit includes a received voltage detection circuit that detects a received voltage from the output voltage of the rectifier circuit, and a charging voltage detection circuit that detects a charging voltage from an output voltage of the voltage conversion circuit.

The charge control circuit starts charging the electric storage device when the received voltage is greater than or equal to a first received voltage value, decreases a set value of a charging current for the electric storage device when the charging voltage is less than a predetermined charging voltage value, increases the set value of the charging current for the electric storage device when the received voltage is greater than or equal to a second received voltage value higher than the charging voltage value, and maintains the set value of the charging current when the charging voltage is greater than or equal to the charging voltage value and the received voltage is less than the second received voltage value.

The present disclosure makes it possible to automatically set a higher charging current according to received power and thereby makes it possible to use higher received power, increase charging efficiency, and improve convenience. Also, the present disclosure makes it possible to provide a reliable wireless power receiving device configured to prevent an electric storage device from being overcharged and prevent an overvoltage from being applied to a power receiving circuit.

BRIEF DESCRIPTION OF THE DRAWINGS

FIG. 3 is a drawing showing a relationship between four conditions of control signals for a charging circuit and set charging currents.

DETAILED DESCRIPTION

Figure 1:
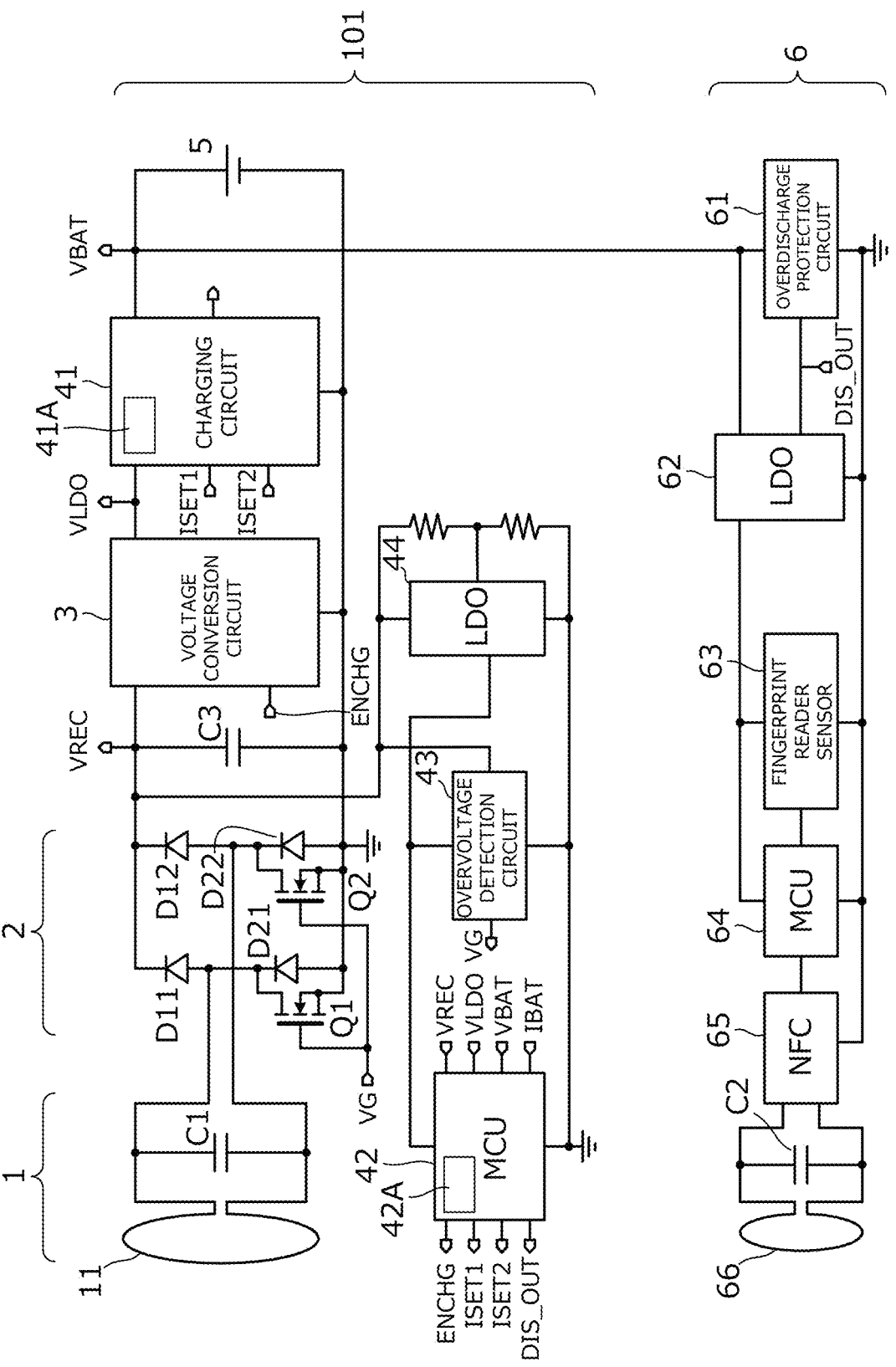
FIG. 1 is a block diagram illustrating configurations of a wireless power receiving device and an electronic function circuit according to the present embodiment.

FIG. 1 is a block diagram illustrating configurations of a wireless power receiving device 101 and an electronic function circuit 6 according to the present embodiment. The wireless power receiving device 101 and the electronic function circuit 6 are provided on an electronic card. The wireless power receiving device 101 includes a power receiving resonant circuit 1, a rectifier circuit 2, a voltage conversion circuit 3, a charging circuit 41, an MCU 42, an overvoltage detection circuit 43, a voltage regulator circuit 44, and an electric storage device 5.

The power receiving resonant circuit 1 includes a power receiving coil 11 and a capacitor C1 connected to the power receiving coil 11. The rectifier circuit 2 rectifies the voltage of the power receiving resonant circuit 1. The voltage conversion circuit 3 converts the output voltage of the rectifier circuit 2. The charging circuit 41 charges the electric storage device 5 with the output of the voltage conversion circuit 3. The MCU 42 receives various voltage signals and outputs control signals to, for example, the voltage conversion circuit 3 and the charging circuit 41.

In the descriptions below, the name of a terminal and the name of a signal associated with the terminal are represented by a common symbol.

The MCU 42 detects a received voltage VREC from the output of the rectifier circuit 2. That is, the MCU 42 includes a function of a received voltage detection circuit 42A. The charging circuit 41 detects a charging voltage VLDO from the output voltage of the voltage conversion circuit 3. That is, the charging circuit 41 includes a charging voltage detection circuit 41A. The overvoltage detection circuit 43 detects an overvoltage state in which the received voltage VREC is greater than a predetermined voltage and outputs a control signal VG to the rectifier circuit 2 when the overvoltage state is detected. The voltage regulator circuit 44 receives the received voltage VREC and supplies a predetermined constant voltage as a power supply voltage to the MCU 42 and the overvoltage detection circuit 43.

The charging voltage detection circuit 41A, the received voltage detection circuit 42A, the overvoltage detection circuit 43, and the voltage regulator circuit 44 constitute a "charge control circuit".

The electronic function circuit 6 includes an overdischarge protection circuit 61, a voltage regulator circuit 62, a fingerprint reader sensor 63, an MCU 64, an NFC communication circuit 65, a communication coil 66, and a capacitor C2. In this example, the electronic function circuit 6 is driven by electric power from the electric storage device 5.

Operations of components of the wireless power receiving device 101 are described below.

The power receiving coil 11 is coupled by electromagnetic induction to a power-supply coil (not shown). With the power receiving coil 11 and the capacitor C1, the power receiving resonant circuit 1 exhibits resonance. The rectifier circuit 2 includes a diode bridge constituted by diodes D11, D12, D21, and D22 and a capacitor C3. The diode bridge full-wave rectifies a voltage, and the capacitor C3 smooths the voltage. Although the rectifier circuit 2 includes switch elements Q1 and Q2, the switch elements Q1 and Q2 are off in a normal state that is different from an overvoltage state described later. The voltage conversion circuit 3 converts the received voltage VREC, which is the output voltage of the rectifier circuit 2, into a predetermined charging voltage VLDO. The charging circuit 41 receives the charging voltage and charges the electric storage device 5. For example, the received voltage VREC is less than 17 V, the charging voltage VLDO is 5 V, and a voltage VBAT of the electric storage device 5 is, for example, 3.0 V.

The MCU 42 is driven by the output voltage of the voltage regulator circuit 44, receives the received voltage VREC, the charging voltage VLDO, and the electric storage device voltage VBAT, and outputs a control signal ENCHG for the voltage conversion circuit 3 and control signals ISET1 and ISET2 for the charging circuit 41. Specifically, the MCU 42 sets the logical level of the control signal ENCHG to a predetermined value to activate the voltage conversion circuit 3 and sets the charging circuit 41 to states described later by using the control signals ISET1 and ISET2.

When detecting an overvoltage state in which the received voltage VREC is greater than a third received voltage value of 17.0 V, which is higher than a second received voltage value (6.00 V) described later, the overvoltage detection circuit 43 switches the control signal VG to the high level. As a result, the switch elements Q1 and Q2 of the rectifier circuit 2 are turned on, the outputs of the power receiving resonant circuit 1 are short-circuited by the switch elements Q1 and Q2, and the output voltage of the rectifier circuit 2 is reduced.

Operations of the charge control circuit constituted by the charging voltage detection circuit 41A, the received voltage detection circuit 42A, the overvoltage detection circuit 43, and the voltage regulator circuit 44 are described below.

(1) When the received voltage VREC is greater than or equal to a first received voltage value, the charge control circuit starts charging the electric storage device 5.

(2) When the charging voltage VLDO is less than a predetermined charging voltage value, the charge control circuit decreases the set value of the charging current for the electric storage device 5.

(3) When the received voltage VREC is greater than or equal to the second received voltage value higher than the predetermined charging voltage value, the charge control circuit increases the set value of the charging current for the electric storage device 5.

(4) When the charging voltage VLDO is greater than or equal to the predetermined charging voltage value and the received voltage VREC is less than the second received voltage value, the charge control circuit maintains the set value of the charging current.

(5) When the voltage of the electric storage device 5 becomes greater than or equal to a voltage value corresponding to the fully charged state of the electric storage device 5, the charge control circuit stops charging.

(6) When the voltage of the electric storage device 5 becomes less than or equal to a predetermined value, the charge control circuit starts charging.

(7) When the charging current value for the electric storage device 5 becomes less than or equal to a current corresponding to the fully charged state of the electric storage device 5, the charge control circuit stops charging.

(8) When the received voltage VREC is greater than or equal to the third received voltage value higher than the second received voltage value, the charge control circuit controls the rectifier circuit 2 to stop rectification and thereby stops receiving power.

Operations of the electronic function circuit 6 are described below.

The communication coil 66 is coupled by electromagnetic induction to a coil with which the communication coil 66 communicates, and the communication coil 66 and the capacitor C2 exhibit resonance. The NFC communication circuit 65 performs NFC communication with a communication partner device. The MCU 64 receives data received by the NFC communication circuit 65 and outputs data read by the fingerprint reader sensor 63 or processed data of the read data to the NFC communication circuit 65. The fingerprint reader sensor 63 reads a fingerprint of an operator operating the electronic card including the wireless power receiving device 101 and the electronic function circuit 6. The voltage regulator circuit 62 converts the voltage of the electric storage device 5 into a predetermined constant voltage and outputs the constant voltage as a power supply voltage to the MCU 64 and the fingerprint reader sensor 63. The overdischarge protection circuit 61 detects the voltage of the electric storage device 5 and when an overdischarge state is detected, supplies a voltage signal indicating the overdischarge state to the voltage regulator circuit 62 as a reference voltage. When the overdischarge state is detected, the voltage regulator circuit 62 stops outputting the voltage. Although omitted in FIG. 1, the MCU 42 can detect the operating status of the electronic function circuit 6. While the electronic function circuit 6 is in operation, the MCU 42 stops outputting the control signal ENCHG to the voltage conversion circuit 3 and stops charging the electric storage device 5. While the electric storage device 5 is charged, the MCU 42 outputs an output signal DIS_OUT, which indicates that the electric storage device 5 is being charged, to the voltage regulator circuit 62, and the voltage regulator circuit 62 stops outputting the voltage.

Figure 2:
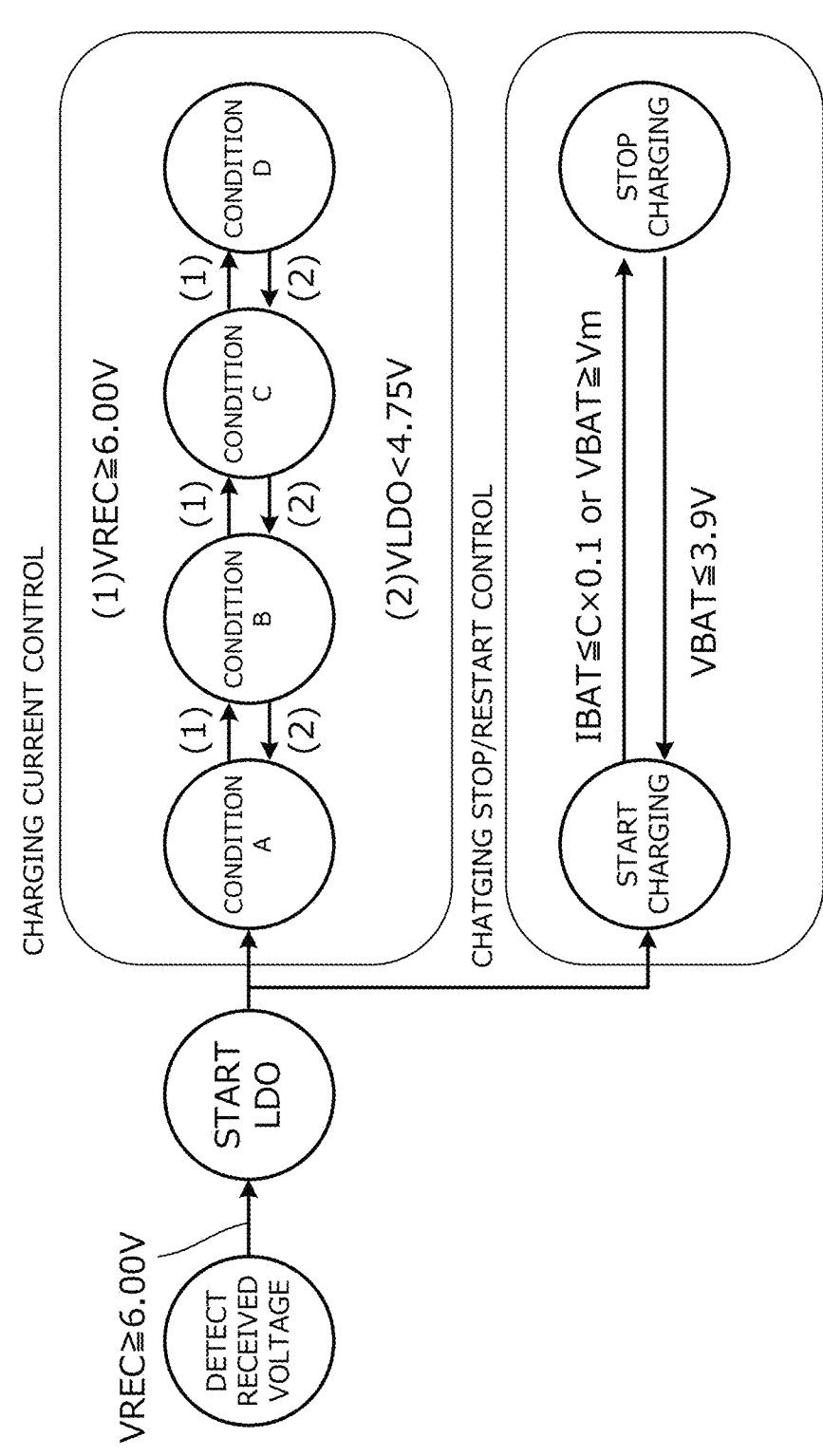
FIG. 2 is a drawing illustrating processing performed by an MCU of the wireless power receiving device.

FIG. 2 illustrates processing performed by the MCU 42 of the wireless power receiving device 101. FIG. 3 is a drawing showing a relationship between four conditions of the control signals ISET1 and ISET2 for the charging circuit 41 and set charging currents ICHG. Operations of the charge control circuit implemented by the processing performed by the MCU 42 of the wireless power receiving device 101 are described below.

As illustrated in the upper part of FIG. 2, the charge control circuit first detects the received voltage VREC and activates the signal ENCHG for the voltage conversion circuit 3 when the received voltage VREC is greater than or equal to the first received voltage value of 6.00 V. Then, when the received voltage VREC is greater than or equal to the second received voltage value of 6.00 V (in the present embodiment, first received voltage value=second received voltage value), the charge control circuit outputs ISET1=0 and ISET2=0 as control values for the charging circuit 41. This corresponds to a condition A, and the charging circuit 41 sets the charging current for the electric storage device 5 at 1.85 mA. When the received voltage VREC is greater than or equal to 6.00 V even in this state, the charge control circuit outputs ISET1=0 and ISET2=1 as control values. This corresponds to a condition B, and the charging circuit 41 sets the charging current for the electric storage device 5 at 4.60 mA. When the received voltage VREC is greater than or equal to 6.00 V even in this state, the charge control circuit outputs ISET1=1 and ISET2=0 as control values. This corresponds to a condition C, and the charging circuit 41 sets the charging current for the electric storage device 5 at 7.51 mA. Thus, when the received voltage VREC is greater than or equal to the second received voltage value of 6.00 V, the set value of the charging current for the electric storage device 5 is gradually increased.

When the charging voltage VLDO is less than a predetermined charging voltage value of 4.75 V, which is lower than the second received voltage value of 6.00 V, the charge control circuit reduces the set value of the charging current for the electric storage device 5. For example, in the condition C, the charge control circuit outputs ISET1=0 and ISET2=1 as control values. This corresponds to the condition B, and the charging circuit 41 sets the charging current for the electric storage device 5 at 4.60 mA. When the charging voltage VLDO is less than the predetermined charging voltage value of 4.75 V even in this state, the charge control circuit outputs ISET1=0 and ISET2=0 as control values. This corresponds to the condition A, and the charging circuit 41 sets the charging current for the electric storage device 5 at 1.85 mA. Thus, when the charging voltage VLDO is less than the predetermined charging voltage value of 4.75 V, the set value of the charging current for the electric storage device 5 is gradually decreased.

Also, when the charging voltage VLDO is greater than or equal to the predetermined charging voltage value of 4.75 V and the received voltage VREC is less than the second received voltage value of 6.00 V, the charge control circuit maintains the set value of the charging current.

Setting the charging current at multiple discrete values as described above simplifies setting control and also makes it possible to control the charging current as a continuous quantity.

Also, as illustrated in the lower part of FIG. 2, when the voltage VBAT of the electric storage device 5 is less than or equal to a minimum voltage value of 3.9 V, the charge control circuit starts charging by activating the signal ENCHG for the voltage conversion circuit 3. When a charging current IBAT for the electric storage device 5 is less than or equal to a set current value C×0.1, the charge control circuit stops charging by deactivating the signal ENCHG for the voltage conversion circuit 3. Also, when the voltage VBAT of the electric storage device 5 is greater than or equal to a voltage Vm corresponding to a full charge, the charge control circuit stops charging by deactivating the signal ENCHG for the voltage conversion circuit 3. The control process for stopping and restarting charging and the control process for controlling the charging current value are performed in parallel as independent control processes.

Figure 4:
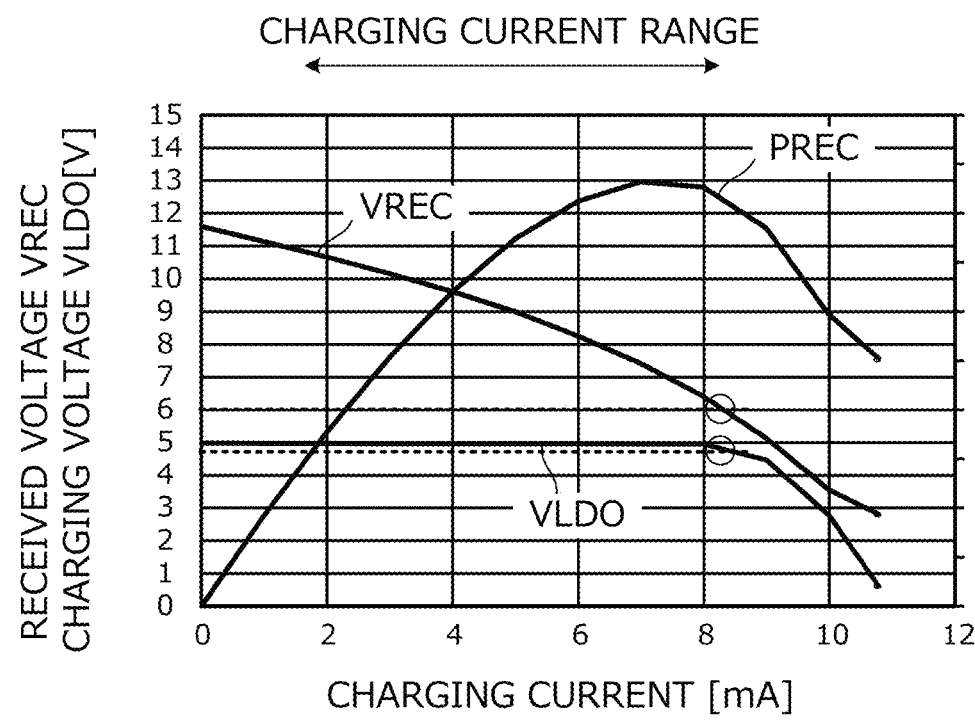
FIG. 4 is a drawing illustrating a relationship among a charging current, a received voltage, a charging voltage, and received power.

FIG. 4 is a drawing illustrating a relationship among the charging current IBAT the received voltage VREC, the charging voltage VLDO, and received power. Charging is performed with a charging current greater than or equal to 1.85 mA and less than or equal to 9.97 mA (i.e., from 1.85 mA to 9.97 mA) while the received voltage VREC is greater than or equal to 6.00 V and the charging voltage VLDO is greater than or equal to 4.75 V. As the charging current increases, the received voltage VREC decreases. In FIG. 4, PREC indicates the received power. In this example, the received power becomes the maximum when the charging current IBAT is 7 mA.

With the operations of the charge control circuit described above, it is possible to set a greater charging current according to received power and to use higher received power. Also, the above embodiment makes it possible to provide a reliable wireless power receiving device 101 that can prevent the electric storage device 5 from being overcharged and prevent an overvoltage from being applied to power receiving circuits such as the voltage conversion circuit 3 and the charging circuit 41.

In the example described above, both the first received voltage value and the second received voltage value are 6.00 V. However, the first received voltage value at which the charging current control is started may be lower than the second received voltage value.

The present disclosure is not limited to the above-described embodiment. Variations and modifications may be made as appropriate by those skilled in the art. The scope of the present disclosure is defined by the claims, not by the embodiment described above. Furthermore, the scope of the present disclosure includes variations and modifications from the embodiment in a range equivalent to the claims.

What is claimed is:

1. A wireless power receiving device comprising:
   a power receiving resonant circuit including a power receiving coil and a resonant capacitor connected to the power receiving coil;
   a rectifier circuit configured to rectify a voltage of the power receiving resonant circuit;
   a voltage conversion circuit configured to convert an output voltage of the rectifier circuit; and a charge control circuit configured to charge an electric storage device with an output of the voltage conversion circuit, wherein the charge control circuit includes a received voltage detection circuit configured to detect a received voltage from the output voltage of the rectifier circuit, and a charging voltage detection circuit configured to detect a charging voltage from an output voltage of the voltage conversion circuit; and the charge control circuit is configured to start charging the electric storage device when the received voltage is greater than or equal to a first received voltage value, decrease a set value of a charging current for the electric storage device when the charging voltage is less than a predetermined charging voltage value, increase the set value of the charging current for the electric storage device when the received voltage is greater than or equal to a second received voltage value, the second received voltage value being higher than the predetermined charging voltage value, and maintain the set value of the charging current when the charging voltage is greater than or equal to the predetermined charging voltage value and the received voltage is less than the second received voltage value.

2. The wireless power receiving device according to claim 1, wherein the charge control circuit is configured to control the rectifier circuit to stop rectification and thereby stops receiving power when the received voltage is greater than or equal to a third received voltage value, the third received voltage value being higher than the second received voltage value.

3. The wireless power receiving device according to claim 1, wherein the charge control circuit is configured to stop charging when a charging current value for the electric storage device becomes less than or equal to a current corresponding to a fully charged state of the electric storage device.

4. The wireless power receiving device according to claim 3, wherein the charge control circuit is configured to control the rectifier circuit to stop rectification and thereby stops receiving power when the received voltage is greater than or equal to a third received voltage value, the third received voltage value being higher than the second received voltage value.

5. The wireless power receiving device according to claim 1, wherein the charge control circuit is configured to start charging when a voltage of the electric storage device becomes less than or equal to a predetermined value.

6. The wireless power receiving device according to claim 5, wherein the charge control circuit is configured to stop charging when a charging current value for the electric storage device becomes less than or equal to a current corresponding to a fully charged state of the electric storage device.

7. The wireless power receiving device according to claim 5, wherein the charge control circuit is configured to control the rectifier circuit to stop rectification and thereby stops receiving power when the received voltage is greater than or equal to a third received voltage value, the third received voltage value being higher than the second received voltage value.

8. The wireless power receiving device according to claim 1, wherein the charge control circuit is configured to stop charging when a voltage of the electric storage device becomes greater than or equal to a voltage value corresponding to a fully charged state of the electric storage device.

9. The wireless power receiving device according to claim 8, wherein the charge control circuit is configured to stop charging when a charging current value for the electric storage device becomes less than or equal to a current corresponding to a fully charged state of the electric storage device.

10. The wireless power receiving device according to claim 8, wherein the charge control circuit is configured to control the rectifier circuit to stop rectification and thereby stops receiving power when the received voltage is greater than or equal to a third received voltage value, the third received voltage value being higher than the second received voltage value.

11. The wireless power receiving device according to claim 8, wherein the charge control circuit is configured to start charging when a voltage of the electric storage device becomes less than or equal to a predetermined value.

12. The wireless power receiving device according to claim 11, wherein the charge control circuit is configured to stop charging when a charging current value for the electric storage device becomes less than or equal to a current corresponding to a fully charged state of the electric storage device.

13. The wireless power receiving device according to claim 1, wherein the set value of the charging current is set at multiple discrete values.

14. The wireless power receiving device according to claim 13, wherein the charge control circuit is configured to stop charging when a charging current value for the electric storage device becomes less than or equal to a current corresponding to a fully charged state of the electric storage device.

15. The wireless power receiving device according to claim 13, wherein the charge control circuit is configured to control the rectifier circuit to stop rectification and thereby stops receiving power when the received voltage is greater than or equal to a third received voltage value, the third received voltage value being higher than the second received voltage value.

16. The wireless power receiving device according to claim 13, wherein the charge control circuit is configured to start charging when a voltage of the electric storage device becomes less than or equal to a predetermined value.

17. The wireless power receiving device according to claim 16, wherein the charge control circuit is configured to stop charging when a charging current value for the electric storage device becomes less than or equal to a current corresponding to a fully charged state of the electric storage device.

18. The wireless power receiving device according to claim 13, wherein the charge control circuit is configured to stop charging when a voltage of the electric storage device becomes greater than or equal to a voltage value corresponding to a fully charged state of the electric storage device.

19. The wireless power receiving device according to claim 18, wherein the charge control circuit is configured to start charging when a voltage of the electric storage device becomes less than or equal to a predetermined value.

20. The wireless power receiving device according to claim 18, wherein the charge control circuit is configured to stop charging when a charging current value for the electric storage device becomes less than or equal to a current corresponding to a fully charged state of the electric storage device.

\* \* \* \* \*